United States Patent Office 3,105,000
Patented Sept. 24, 1963

3,105,000
ORGANO-TIN AND ORGANO-SULPHUR
PARASITICIDES
John L. Hardy, Midland, Mich., assignor to The Dow
Chemical Company, Midland, Mich., a corporation of
Delaware
No Drawing. Filed May 25, 1961, Ser. No. 112,497
6 Claims. (Cl. 167—22)

This invention is concerned with parasiticides and is particularly directed to methods and compositions for the control of parasitic organisms.

It is an object of the present invention to provide a new and improved method for the control of many common household and agricultural pests. A further object is the provision of a method wherein many plant attacking and destroying parasitic organisms may be controlled without substantial injury to the host plant. An additional object is the provision of a method which is systemic in its mode of action, whereby the treatment of plant roots effectively provides for the control of parasites which attack the above-ground portions of plants. Yet another object is the provision of novel compositions to be employed in the improved methods for parasite control. Additional objects will become apparent from the following specification and claims.

In accordance with the present invention, it has been discovered that tin compounds corresponding to the formula

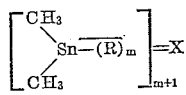

are excellent parasiticides and are adapted to be employed for the control of a wide range of agricultural and household pests. In this and succeeding formulae, X represents oxygen or sulfur, R represents lower alkanoyl and m represents 0 or 1. The expression "lower alkanoyl" is employed in the present specification and claims to refer to alkanoyl radicals containing from 1 to 4 carbon atmos, inclusive. These tin compounds are crystalline solid materials which are somewhat soluble in many common organic solvents and of low solubility in water. They are adapted readily and conveniently to be employed for the control of many parasitic organisms and particularly those ordinarily found upon and attacking plant parts or the aerial portions of growing plants. Representative organisms include southern arm worms, cabbage looper, tent caterpillar, coddling moth, flies, etc. It is an advantage of the present invention that compositions containing these compounds may be applied to growing vegetation in amounts required for effective control without significant injury to the plants. It is a further advantage that a single application of the compounds will provide a residual and extended control of the parasites over a period of several months. It is a further advantage that the compounds operate systemically through the plant body and are absorbed through the roots of the plants and from plant seeds into young seedlings to control parasites attacking the plants.

In carrying out the method of the present invention, the undesirable pests may be controlled by contacting the organisms, their habitats, and/or their food prior to ingestion with a parasiticidal amount of the unmodified tin products. However, the present method also embraces the employment of liquid or dust compositions containing the toxicants. Such compositions are adapted to be applied to seeds or the aerial portions of living plants without substantial injury to the foliage thereof, or to facilitate the penetration and impregnation of the toxicants in the soil adjacent to the root systems of growing plants to provide for their subsequent incorporation into the plant and systemic and extended control of leaf and root attacking parasites. In preparing compositions for parasite and insect control, the tin compounds are modified with one or more of a plurality of additaments or parasiticide adjuvants, including aromatic solvents, petroleum distillates, water or other liquid carriers, surface active dispersing agents and particulate and finely comminuted or divided solids. Depending upon the concentration in the compositions of the tin products, such augmented compositions are adapted to be employed for the control of undesirable parasites, or employed as concentrates and subsequently diluted with additional inert carrier to produce the ultimate treating compositions. In compositions to be employed as concentrates, the tin toxicants may be present in concentrations of from about 5 to about 98 percent by weight.

The exact concentration of the tin products employed in a composition for application to the pest, its habitat or food, may vary provided a parasiticidal dosage of toxicant is supplied either on the organism or its environments, or its food. This dosage of toxicant is primarily dependent upon the susceptibility of a particular organism to the tin products. In general, good results are obtained with liquid compositions containing at least 0.0005 percent by weight of toxicant. Sometimes compositions containing as high as 90 percent by weight of toxicant may be employed in the treatment of environments or food such as the preparation of food baits. With dusts, good results are obtained with compositions containing from 0.01 to 50 percent or more by weight of toxicant. Where the compositions are to be applied to living plants, it is preferred that the toxicant be present in an amount not to exceed about 1.0 percent in liquid compositions and about 10 percent in dusts.

In the preparation of dust compositions, the tin products may be compounded with any of the finely divided solids such as pyrophyllite, diatomaceous earth, talc, chalk, gypsum and the like. In such operations, the finely divided carrier is ground or mixed with the toxicant or wet with a solution of the toxicant in a volatile organic solvent. Similarly, dust compositions containing the tin products may be similarly compounded from various of the solid surface active dispersing agents such as fuller's earth, attapulgite, and bentonite. Depending upon the proportion of ingredients, these dust compositions may be employed as concentrates and subsequently diluted with additional solid surface active dispersing agent or with pyrophyllite, chalk, talc, gypsum and the like to obtain the desired amount of active ingredient in a comminuted composition adapted to be employed for the control of pests. Also, such concentrate dust compositions may be dispersed in water with or without the aid of surface active agents to form spray mixtures. Further, the tin compounds or a liquid or dust concentrate composition containing such compounds may be incorporated in intimate admixture with surface active dispersing agents such as ionic and non-ionic and emulsifying and dispersing agents to form spray concentrates. Such concentrates are readily dispersible in liquid carriers to form spray compositions or liquid formulations containing the toxicants in any desired amount. The choice of surface active agent and amount thereof employed are determined by the ability of the agent to facilitate the dispersion of the concentrate in the liquid carrier to produce the desired liquid composition. Suitable liquid carriers include acetone, methylene chloride, chlorobenzene, and petroleum distillates. Among the petroleum distillates are preferred those boiling almost entirely under 400° F. at atmospheric pressure and having a flash point above about 80° F.

Similarly, the toxicant products may be compounded with a suitable water immiscible organic liquid and a surface active dispersing agent to produce emulsifiable concentrates which may be further diluted with water and oil to form spray mixtures in the form of oil-in-water emulsions. In such compositions, the carrier comprises an aqueous emulsion, i.e., a mixture of water immiscible solvent, emulsifying agent and water. Preferred dispersing agents which may be employed in these compositions are oil soluble and include the condensation products of alkylene oxides with phenols and organic and inorganic acids, polyoxyethylene derivatives of sorbitan esters, alkylarylsulfonates, complex ether alcohols, mahogany soaps and the like. Suitable organic liquids to be employed in the compositions include petroleum distillates, hexanal, liquid halohydrocarbons and synthetic organic oils. The surface active dispersing agents are usually employed in the liquid dispersions and aqueous emulsions in the amount of from 1 to 20 percent by weight of the combined weight of the dispersing agent and the active toxicant.

When operating in accordance with the present invention, the tin products or a composition containing the products may be applied to the pests to be controlled or to their habitat or to their food in any convenient fashion, i.e., by means of hand dusters or sprayers or by simple mixing with the food to be ingested by the organisms. The distribution of the compounds in soil is conveniently accomplished by the employment of a liquid carrier to accomplish the impregnation and penetration of the soil with the toxicant compound. Applications to the foliage of plants conveniently is carried out with power dusters, boom sprayers and spray dusters. In such applications, the employed compositions should not contain substantial amounts of phytotoxic diluents. In large scale operations, dusts or low volume sprays may be applied from an airplane.

The following examples illustrate the present invention but are not to be construed as limiting its scope.

*Example I*

Twenty-five parts by weight of thiobis(dimethyl tin butyrate) and thiobis(dimethyl tin acetate) are each separately mixed and ground with 71 parts of fuller's earth, 2 parts of an alkyl aryl sulfonate (Nacconol NR) and 2 parts of a substituted benzoid alkyl sulfonic acid (Daxad No. 27) to prepare concentrate compositions in the form of a wettable powder and containing one of the tin compounds as an active agent.

Also, 95 parts by weight of dimethyl tin sulfide and 5 parts of a sorbitan monolaurate polyoxyethylene derivative (Tween 20) are mechanically mixed together to prepare a dispersible liquid concentrate composition.

In a further operation, 4 parts by weight of oxybis(dimethyl tin propionate) 90 parts of hexanal and 6 parts of dimeric alkylated aryl polyether alcohol (Triton X–155) are mechanically mixed together to prepare a concentrate composition in the form of an emulsifiable liquid.

These concentrates are dispersed in water to prepare aqueous compositions having very desirable wetting and penetrating properties. The latter aqueous compositions are adapted to be employed to distribute the active toxicants in parasiticidal amounts.

*Example II*

Dimethyl tin oxide, Nacconol NR and Daxad No. 27 are dispersed in water to prepare an aqueous spray composition containing 0.02 pound of the oxide compound and 0.25 pound each of Nacconol NR and Daxad No. 27 per 100 gallons of ultimate mixture.

This spray composition is employed for the control of southern army worms on cranberry bean plants. In such operations, the foliage of the bean plants is wet with the compositions, the leaf surfaces allowed to dry and the plants then infested with the insect larvae of southern army worm. One week following the infestation, the plants are examined and a 100 percent kill of southern army worms observed.

*Example III*

A composition containing 0.04 pound of oxybis(dimethyl tin acetate) and 0.25 pound of each Nacconol NR and Daxad No. 27 is prepared and employed as described in Example II for the control of southern army worms on cranberry bean plants. As a result of these operations, there is obtained a 100 percent kill of southern army worms.

*Example IV*

25 parts by weight of oxybis(dimethyl tin acetate) 71 parts of pyrophyllite, 2 parts of Daxad No. 27 and 2 parts of an alkyl naphthlene sulfonate (Petro WP) are mixed together to produce a concentrate composition in the form of a wettable powder. In an exactly analogous fashion a similar concentrate composition is prepared employing dimethyl tin oxide as the toxicant. These concentrates are subsequently dispersed in water to prepare aqueous compositions containing 1500 parts per million by weight of one of the tin compounds, and the compositions employed for the treatment of rows of seedling cotton plants for the systemic control of cotton leaf perforator.

In such operations, the compositions are applied to the soil along the rows and adjacent the roots of the plants in an amount of 5 pounds of one of the compounds per acre. Adjacent rows of cotton plants are left untreated to serve as checks. Following the treating operations, the plants are observed to ascertain what control of leaf perforator is obtained. The observations show a 100 percent kill and control of leaf perforator by both toxicant compositions for a period of three weeks following the treating operations. Throughout the period of the observations, the untreated check plants are found to support a heavy infestation of cotton leaf perforators.

*Example V*

The aqueous compositions as described in Example IV are also employed for the treatment of rows of seedling nasturtium plants for the systemic control of bean aphids. In such operations, the compositions are applied to the soil along the rows and adjacent the roots of the plants in an amount of 5 pounds of one of the compounds per acre. Adjacent rows of nasturtium plants are left untreated to serve as checks. Following the treating operations, the plants are observed to ascertain what control of bean aphids is obtained. The observations show a 100 percent kill and control of bean aphids by both toxicant compositions for a period of 3 weeks following the treating operations. Throughout the observation period, the nasturtium plants in the untreated check rows are found to support heavy infestation of bean aphids.

*Example VI*

A wettable powder concentrate composition was prepared in the manner as described in Example IV using thiobis(dimethyl tin acetate) as the toxicant compound. This concentrate composition and the wettable powder concentrate composition containing oxybis(dimethyl tin acetate) as described in Example IV were dispersed in water to prepare aqueous compositions containing 500 parts per million by weight of one of the tin compounds. These compositions are employed for the treatment of mature cranberry bean plants for the systemic control of southern army worms. In such operations, the compositions are applied to the soil along the rows and adjacent to the roots of the plant in the amount of 5 pounds per acre. Adjacent seed beds of cranberry bean plants are left untreated to serve as checks. Three days following the treating operations, the plants in the treated area and the plants in the untreated area are infested with larvae of southern army worm. One week following the infestation, the plants in the treated area are examined and a 100 percent kill of southern army worms observed. At the time of the observations, the plants in the untreated check areas are found to support a very heavy infestation of southern army worms.

*Example VII*

The wettable powder concentrate compositions containing oxybis(dimethyl tin acetate) and dimethyl tin oxide as described in Example IV were employed as seed treating compositions for the treatment of cranberry bean seeds. In such operations, the seeds were dusted with an amount of the treating compositions corresponding to 2 ounces of one of the tin compounds per hundred ounces of seeds. Following the treating operations, the seeds were planted in seed beds. In a check operation, untreated seeds were similarly planted in adjacent seed beds.

About 8 days after planting, the emerged bean seedlings in the seed beds were infested with the larvae of southern army worms. Following the infestation, the plants are regularly observed to determine the control of southern army worms. As a result of these observations, there is found a 100 percent kill of southern army worms by both tin compounds. At the time of the observations, the plants from the untreated check seeds are found to support a heavy infestation of southern army worms.

The oxybis(dimethyl tin alkanoates) and thiobis(dimethyl tin alkanoates) employed in accordance with the present teachings are prepared in known methods wherein dimethyl tin dichloride is reacted with an alkanoic acid to produce a dimethyl tin dialkanoate. This dialkanoate intermediate is thereafter treated with water or with hydrogen sulfide to obtain the oxybis- or thiobis(dimethyl tin alkanoate) products.

I claim:
1. A method which comprises applying to parastic organisms and their habitats and food a parasiticidal amount of a compound corresponding to the formula

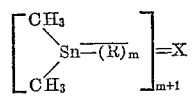

wherein X represents a member of the group consisting of oxygen and sulfur, R represents a lower alkanoyl radical, and $m$ represents a member of the group consisting of 0 and 1.

2. A method claimed in claim 1 wherein the tin compound is oxybis(dimethyl tin acetate).
3. A method claimed in claim 1 wherein the tin compound is dimethyl tin oxide.
4. A method claimed in claim 1 wherein the tin compound is dimethyl tin sulfide.
5. A method claimed in claim 1 wherein the tin compound is thiobis(dimethyl tin acetate).
6. A composition comprising a tin compound in admixture with a carrier selected from the group consisting of finely divided solids and surface active dispersing agents, said tin compound having the formula

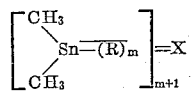

wherein X represents a member of the group consisting of oxygen and sulfur, R represents a lower alkanoyl radical and $m$ represents a member of the group consisting of 0 and 1.

References Cited in the file of this patent
UNITED STATES PATENTS
2,922,738     McDermott et al. _____ Jan. 26, 1960